Figure 1:
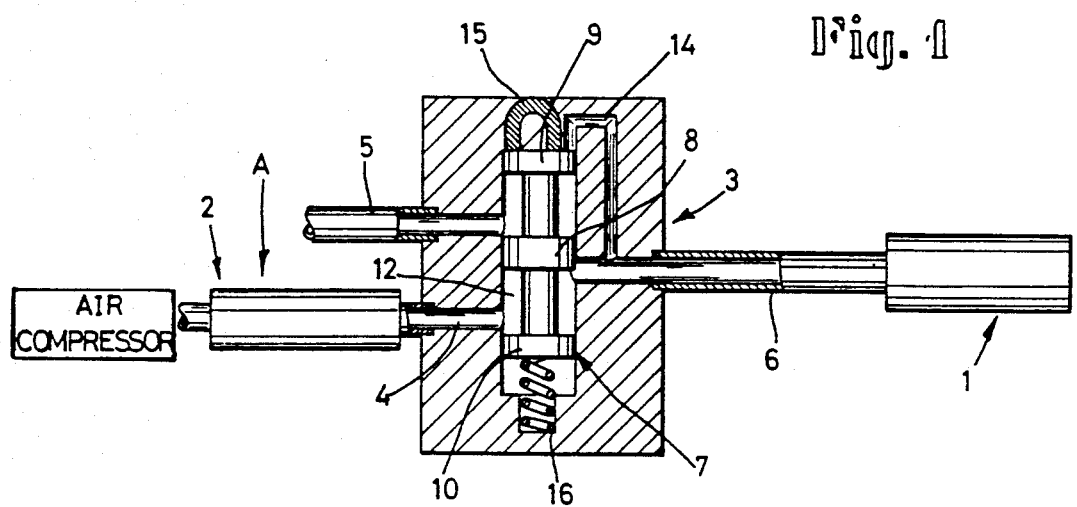

United States Patent [19]

Dües

[11] Patent Number: 5,081,737
[45] Date of Patent: Jan. 21, 1992

[54] APPARATUS FOR ELIMINATING DEPOSITS OF FLOATING FIBERS

[75] Inventor: Theo Dües, Ahaus, Fed. Rep. of Germany

[73] Assignee: Gebruder Schmeing GmbH & Co., Fed. Rep. of Germany

[21] Appl. No.: 331,659
[22] PCT Filed: Jun. 13, 1988
[86] PCT No.: PCT/DE88/00356
§ 371 Date: May 24, 1989
§ 102(e) Date: May 24, 1989
[87] PCT Pub. No.: WO89/01065
PCT Pub. Date: Feb. 9, 1989

[30] Foreign Application Priority Data

Jul. 25, 1987 [DE] Fed. Rep. of Germany ....... 3724708
Aug. 29, 1987 [DE] Fed. Rep. of Germany ....... 3728910

[51] Int. Cl.⁵ .................................................. A47L 5/14
[52] U.S. Cl. .................................. 15/316.1; 137/102; 137/624.12; 138/42
[58] Field of Search .......... 15/316.1; 137/102, 624.12; 138/42

[56] References Cited

U.S. PATENT DOCUMENTS

| | | | |
|---|---|---|---|
| 1,982,997 | 12/1934 | Linder | 15/316.1 |
| 2,748,802 | 6/1956 | Hanson et al. | 138/42 |
| 3,606,904 | 9/1971 | Taylor | 137/102 |
| 3,668,822 | 6/1972 | Mannion et al. | 138/42 X |
| 3,878,869 | 4/1975 | Yamanouchi | |
| 4,085,768 | 4/1978 | Norr | 137/102 |
| 4,261,075 | 4/1981 | Gruen | 15/316.1 |
| 4,397,505 | 8/1983 | Linkner | 137/102 X |
| 4,616,678 | 10/1986 | Hoshi | 138/42 X |
| 4,905,340 | 3/1990 | Gutschmit | 15/316.1 |

FOREIGN PATENT DOCUMENTS

| | | |
|---|---|---|
| 1025178 | 2/1958 | Fed. Rep. of Germany . |
| 1919229 | 3/1970 | Fed. Rep. of Germany . |
| 1251610 | 10/1971 | Fed. Rep. of Germany . |
| 2534938 | 4/1984 | France . |
| 1221619 | 2/1971 | United Kingdom . |

Primary Examiner—Chris K. Moore

[57] ABSTRACT

A device for use in a weaving machine to eliminate accumulations of floating fibers by generating pulses of pressurized air has a storage vessel for pressurized air. The storage vessel is connected to an air compressor via a throttle and a valve disposed between the throttle and the storage vessel. The valve has a passage, a first conduit branching from the passage to the storage vessel, a second conduit branching from the passage to the throttle and air compressor, and a third conduit branching from the passage to a nozzle which can be directed onto the weaving machine. A valving element is movable in the passage between a first position in which the first conduit communicates with the second conduit but is sealed from the third conduit and a second position in which the first conduit communicates with the third conduit but is sealed from the second conduit.

18 Claims, 3 Drawing Sheets

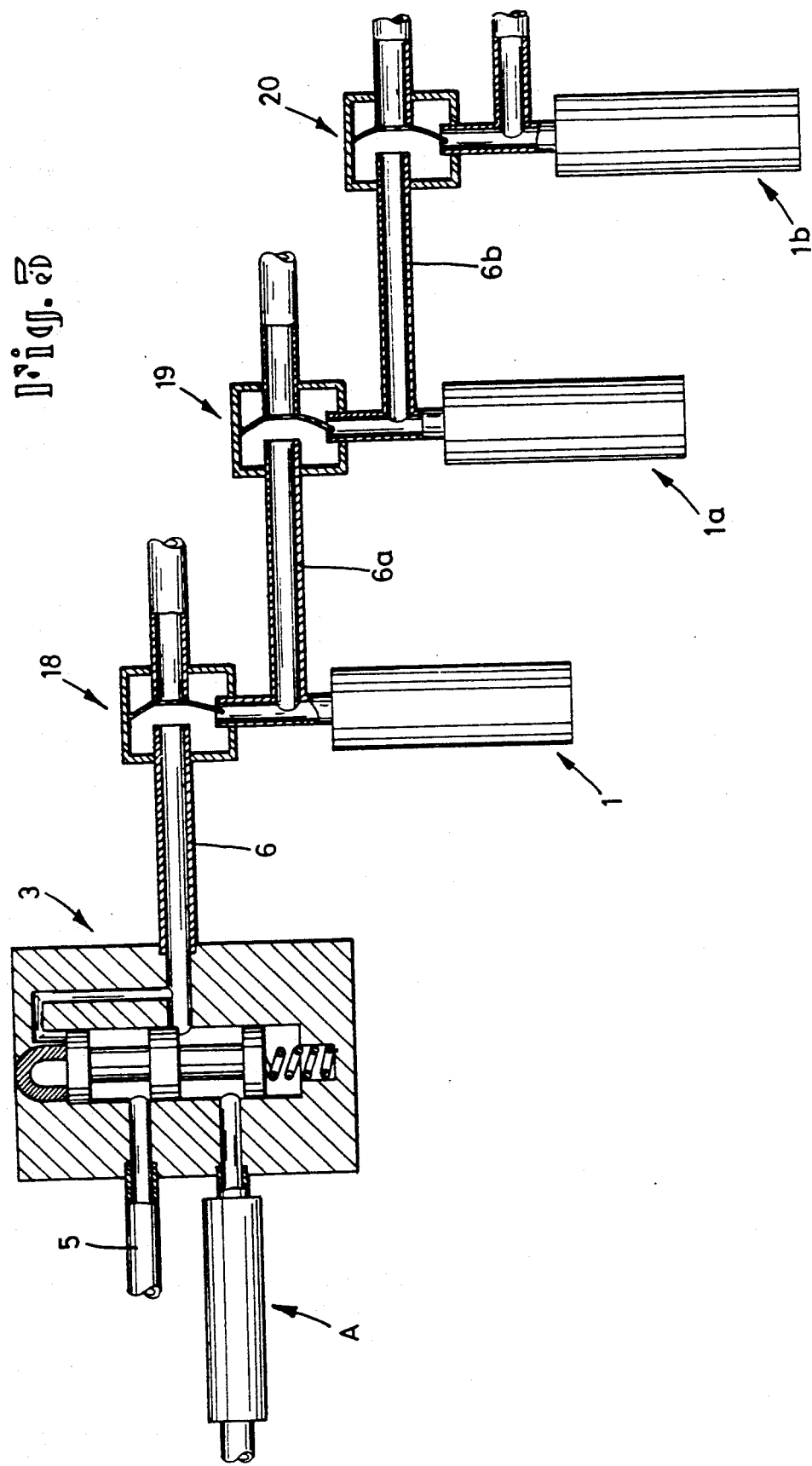

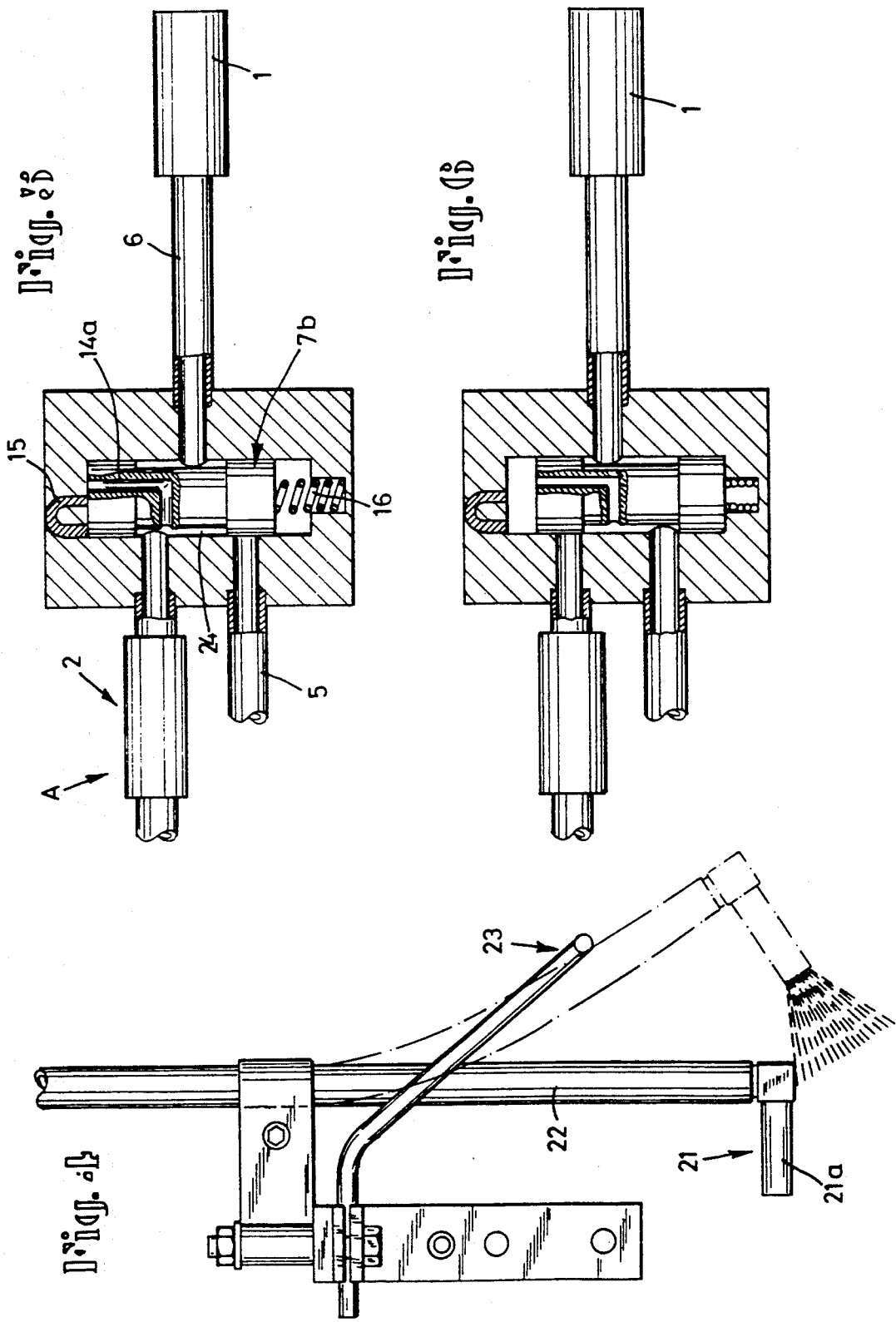

APPARATUS FOR ELIMINATING DEPOSITS OF FLOATING FIBERS

The invention relates to a device for eliminating deposits of floating fibers.

So-called projectile weaving machines are currently coming into ever increasing use. In these projectile weaving machines, the shuttle which carries the bobbin is replaced by a projectile which grasps the weft threads and draws them through the shed. The projectile is guided along its entire path by guiding teeth. To prevent wear of the normally metallic projectile and the metallic guiding teeth, the projectile is lubricated by spraying an oil mist onto the same.

During the processing of so-called "spun yarns" in weaving machines, the presence of floating fibers can never be excluded. In projectile weaving machines, there is then the problem that at least some of the floating fibers come into contact with the oil mist and subsequently enter the fabric as oil impregnated floating fibers. During the following treatment of the fabric, e.g., during dyeing, defects occur in the fabric with the result that entire widths of the fabric must be discarded. The use of cleaning agents before further processing of the fabric is expensive and, in addition to the cost of the cleaning agent, requires a large expense for personnel.

These drawbacks have already been recognized and it is known from the West German Offenlegungsschrift No. 19 19 229 to continuously direct an air stream onto the weaving machine. This air stream is produced by blowers of appropriate capacity, should have a velocity in excess of 300 m/min, preferably about 920 to 6100 m/min, and is directed onto the machine from above as well as transverse to the machine. Here, "pulsating" air streams of 60 to 1000 intervals per minute are to be produced by means of slide valve plates. The continuously operating blowers have the drawback that they use large amounts of energy and that the essentially constant air stream also causes swirling up of an oil mist which then combines with additional floating fibers. Furthermore, the continuous and widespread movement of air inside the weaving room is extremely unpleasant and, in addition, these apparatus are very expensive. The air pulses produced in the known apparatus are also not sufficiently explosion-like to achieve an effective removal of the oil impregnated fibers.

The same problems arise in knitting machines and spinning machines also. Problems with floating fibers and floating dust in other technical fields can similarly be controlled only with difficulty.

It is an object of the invention to provide a device for the explosion-like production of air streams which can be easily constructed and readily installed at arbitrary locations of a weaving machine or other arrangement, is economical and uses small amounts of energy, and does not bother operating personnel working in the weaving room.

In other words, a relatively small, localized, explosion-like air pulse is produced and is intermittently directed only onto those areas of the weaving machine where floating fibers arise, particularly the areas in which floating fibers impregnated with oil mist can arise. A satisfactory loosening of the floating fibers is obtained by the pulsed, short but very strong draft while, on the other hand, the persons working in the weaving room are not bothered. The air consumption required for this is relatively low so that the running energy costs are low and, finally, accumulation of floating fibers or floating fiber wool is prevented.

The time intervals between two cleaning air pulses are preferably about 40 seconds. The short, strong cleaning air pulses generated at short intervals suffice to keep the machine clean Finally, the invention deals particularly with the production of a throttle for pressurized air in order to go via the same from a conventional main pressurized air conduit containing, for example, pressurized air at 6 bars, to a storage vessel which generates intermittent, explosion-like air pulses.

Exemplary embodiments of the invention are described below with reference to the drawings. The drawings illustrate in FIG. 1 schematically a sectional view of the device for generating explosion-like pressurized air pulses in a first position of the change-over valve, in FIG. 2 the device of FIG. 1 in another position of the change-over valve, in FIG. 3 an expanded embodiment for supplying a plurality of pressurized air emitting nozzles using a throttle and a change-over valve, in FIG. 4 a nozzle with a connecting hose and in FIGS. 5 and 6 a modified embodiment of a 3/2 slide valve.

In FIG. 1, a storage vessel for a volume of pressurized air which is to produce a pulse is identified by 1. This storage vessel 1 is connected to a pressurized air supply conduit A. A throttle 2 and a changeover valve 3 are interposed between the pressurized air supply conduit A and the storage vessel 1. The throttle 2 leads into the actual valve housing, in which a sliding body 7 having the form of a 3/2 slide valve is movable, via a pressurized air supply conduit 4. A connecting conduit 6 extends from the chamber which accommodates the sliding body 7 to the storage vessel 1. Furthermore, a pressurized air discharge conduit 5 extends from the chamber accommodating the sliding body 7 to a nozzle 21 which is schematically illustrated in FIG. 4 of the drawing and directs the generated pressurized air pulses onto the desired working location. The nozzle 21 can be constructed as a pivoting nozzle by making it from a section 22 of plastic hose to which the nozzle mouthpiece 21a is attached at a right angle. The nozzle mouthpiece 21a then moves upon discharge of the pressurized air pulse due to the reaction force and thereby distributes the pressurized air stream somewhat. The movement is limited by an abutment 23.

Figure 2:
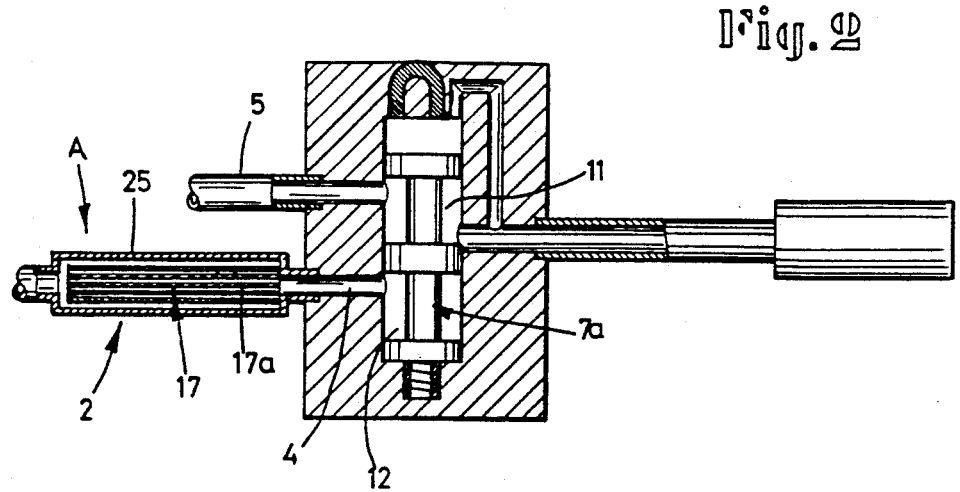

In accordance with FIGS. 1 to 3, the actual sliding body 7 in the changeover valve 3 is constructed as a three piston slider 7a having a lower piston ring 10, a central piston ring 8 and an upper piston ring 9. Flow channels 11 and 12 are formed between the piston rings 9 and 8, and 8 and 7, respectively.

During movement of the sliding body 7a, the central piston ring 8 shifts in front of the opening of the connecting conduit 6 such that this opening of the connecting conduit 6 is in communication either with the flow channel 11, and thus with the pressurized air discharge conduit 5 (FIG. 2), or with the flow channel 12 so that the pressurized air supply conduit 4 communicates with the connecting conduit 6 (FIG. 1).

A bypass conduit 14 extends from the connecting conduit 6 to the upper side of the piston ring or annular piston 9.

A magnet 15 is arranged in the region of the piston ring 9, and the actual sliding body 7a consists of a ferromagnetic material so that, normally, the sliding body 7a is held in the position of FIG. 1 by the magnet 15.

A spring 16 is provided at the lower side of the piston ring or annular piston 10 and helps to return the sliding body 7 from the working position of FIG. 2 to the working position of FIG. 1.

According to an important and significant feature of the invention, the actual throttle 2 consists of a section of a cable 17 which, for instance, is made up of wire cores in a manner known per se, i.e., of individual wires 17a which can be twisted, for example, as in an electric cable. This cable 17, together with its sheath, is disposed inside a jacket 23 such that the pressure existing in the pressurized air supply conduit A acts on the outer side of the cable 17, i.e., the cable sheath, while, on the other hand, the inner space of the cable 17 is in communication with the pressurized air supply conduit A and the conduit 4 so that swelling of the cable sheath cannot occur.

The operation of the device described above is as follows:

The pressurized air generated in the pressurized air supply conduit A by the air compressor not illustrated in the drawing is guided through the throttle 2 and, per FIG. 1, flows into the flow channel 12 of the three piston slider 7a and, from there, through the connecting conduit 6 into the storage vessel 1. When, after some time which depends upon the throttling effect of the throttle 2, a suitable pressure is produced in the storage vessel 1, this pressure acts on the upper side of the piston ring 9 of the three piston slider 7a via the bypass conduit 14. Once the magnitude of the pressure is sufficient to overcome the attractive force of the magnet 15, the three piston slider 7a is abruptly moved downward. The piston ring 9 then moves below the port of the connecting conduit 6 and thereby closes the connecting conduit 6 with respect to the pressurized air supply conduit A or 4, and the flow channel 11 opens for the flow of pressurized air stored in the storage vessel 1 to the pressurized air discharge conduit 5 (FIG. 2).

As soon as the pressure in the storage vessel 1 has been reduced, the spring 16 effects a return of the three piston slider 7a assisted in the last portion of the path by the attractive force of the magnet 15. The position of the three piston slider 7a illustrated in FIG. 1 is then achieved once more, i.e., the storage vessel 1 can again be filled with pressurized air.

It is apparent that the time required to fill the storage vessel 1 with pressurized air depends upon the throttle 2 and that appropriate selection of the length of the latter, e.g., of an electric cable 17, allows this time to be arbitrarily determined. While a slow filling of the storage vessel may thus be achieved, an abrupt emptying of the storage vessel 1 is simultaneously assured so that the desired, explosion-like pressure pulse is produced.

In the embodiment of FIG. 5, the 3/2 slide valve is formed with only two pistons and the bypass conduit is provided in the piston slider 7b as bypass conduit 14a.

In this embodiment, the pressurized air generated in the pressurized air supply conduit A arrives at the connecting conduit 6 via the throttle 2 and the annular chamber 24 formed between the two pistons (FIG. 5). When, after some time which depends upon the throttling effect of the throttle 2, an appropriate pressure is produced in the storage vessel 1, this pressure acts on the upper side of the upper piston through the bypass conduit 14a. Once the magnitude of the pressure is sufficient to overcome the attractive force of the magnet 15, the piston slider 7b is abruptly moved downward and the lower piston then frees the port with the pressurized air discharge conduit 5 (FIG. 6).

The device of the invention makes it possible to operate a plurality of nozzle mouthpieces 21 as illustrated in FIG. 3. A quick acting relief valve 18, 19, 20 of known construction is then connected to the control device shown in FIGS. 1 and 2 between each storage vessel 1, 1a or 1b so that simultaneous filling of the individual storage vessels 1, 1a, 1b is possible. However, upon reversal of the three piston slider 7a, an almost simultaneous changeover of the quick acting relief valves 18 to 20 occurs so that the explosive pulses of pressurized air are generated almost simultaneously at many locations.

I claim:

1. A device for generating air pulses, particularly for use in inhibiting accumulations of matter suspended in air, comprising at least one storage vessel for pressurized air; a throttling element connectible to a source of pressurized air; and a valve arranged to establish communication between said throttling element and said storage vessel, said valve having a passage, an air delivery conduit branching from said passage and connectible with said storage vessel, an air inlet conduit branching from said passage and connectible with said throttling element, an air discharge conduit for air pulses branching from said passage, and a valving element movable in said passage between a first position in which said air delivery conduit communicates with said air inlet conduit but is substantially sealed from said air discharge conduit and a second position in which said air delivery conduit communicates with said air discharge conduit but is substantially sealed from said air inlet conduit.

2. The device of claim 1, wherein said valving element comprises a 3/2 valving element.

3. The device of claim 1, further comprising a nozzle connectible to said air discharge conduit.

4. The device of claim 1, wherein said valving element comprises a central piston ring and an outer piston ring on either side of said central piston ring, said central piston ring and one of said outer piston rings cooperating to define a first space in said passage, and said central piston ring and the other of said outer piston rings cooperating to define a second space in said passage, said conduits and said piston rings being arranged so that said air delivery conduit and said air inlet conduit are in communication with one another via said first space in said first position of said valving element and said air delivery conduit and said air discharge conduit are ian communication with one another via said second space in said second position of said valving element.

5. The device of claim 1, wherein said valving element comprises two piston rings.

6. The device of claim 1, wherein said passage has an end and said valving element has a surface with confronts said end, said valve being provided with a bypass channel arranged to establish communication between said air delivery conduit and said surface.

7. The device of claim 1, said passage having an end; and further comprising a magnet in the region of said end, said valving element including a portion which confronts said end and comprises a ferromagnetic material.

8. The device of claim 1, said passage having two ends and said valving element including a portion which confronts on of said ends; and further comprising a biasing element being said portion and said one end, said biasing element being arranged to urge said valving element towards the other of said ends.

9. The device of claim 8, wherein said biasing element comprises a spring.

10. The device of claim 1, further comprising a nozzle which is articulately connectible to said air discharge conduit.

11. The device of claim 10, wherein said nozzle comprises a flexible hose and a mouthpiece mounted on said hose.

12. The device of claim 11, wherein at least a portion of said hose consists of plastic.

13. The nozzle of claim 11, wherein said mouthpiece is substantially perpendicular to said hose.

14. The device of claim 1, further comprising an additional storage vessel for pressurized air in series with said one storage vessel, an additional conduit for establishing communication between said air delivery conduit and said additional storage vessel, and a quick acting relief valve between said air delivery conduit and said additional storage vessel.

15. The device of claim 1, wherein said throttling element comprises a section of cable.

16. In a device for generating air pulses, at least one storage vessel for pressurized air, and a throttling element located in an airflow line between said storage vessel and a source of pressurized air; said throttling element comprising a section of cable.

17. The structure of claim 16, wherein said section has an outer peripheral surface; said airflow line comprising a conduit connectible between said storage vessel and the source of pressurized air, said section being disposed in said conduit, and said outer peripheral surface defining a gap with said conduit so that pressurized air in said conduit acts on said outer peripheral surface.

18. The structure of claim 17, wherein said gap is substantially annular.

* * * * *